United States Patent
Chou et al.

(10) Patent No.: US 10,764,229 B2
(45) Date of Patent: Sep. 1, 2020

(54) SYSTEMS AND METHODS FOR RANKING CALLS TO ACTION BASED ON INFORMATION ASSOCIATED WITH ONLINE RESOURCES

(71) Applicant: Facebook, Inc., Menlo Park, CA (US)

(72) Inventors: Aaron Gia-Li Chou, San Francisco, CA (US); Vivek Raj, Louisville, KY (US); Zhi Zhong, Sunnyvale, CA (US); Dong Guo, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 510 days.

(21) Appl. No.: 14/981,862

(22) Filed: Dec. 28, 2015

(65) Prior Publication Data
US 2017/0187667 A1    Jun. 29, 2017

(51) Int. Cl.
*H04L 12/58* (2006.01)

(52) U.S. Cl.
CPC ............. *H04L 51/32* (2013.01); *H04L 51/26* (2013.01)

(58) Field of Classification Search
CPC ......... G06Q 30/0282; G06Q 30/06361; G06Q 50/01
USPC ....................................................... 709/206
See application file for complete search history.

(56) References Cited

U.S. PATENT DOCUMENTS

| | | | |
|---|---|---|---|
| 2010/0031163 A1* | 2/2010 | Espinoza | G06Q 10/109 715/749 |
| 2012/0150631 A1* | 6/2012 | Root | G06Q 30/0251 705/14.49 |
| 2012/0290399 A1* | 11/2012 | England | G06Q 30/0282 705/14.66 |
| 2012/0330856 A1* | 12/2012 | Hyder | G06Q 10/00 705/321 |
| 2013/0086169 A1* | 4/2013 | Bruich | H04L 65/40 709/204 |
| 2013/0254308 A1* | 9/2013 | Rose | H04N 21/252 709/206 |
| 2015/0134752 A1* | 5/2015 | Bledsoe | H04L 51/18 709/206 |
| 2015/0207771 A1* | 7/2015 | Birdsall | H04L 51/16 709/206 |
| 2015/0379557 A1* | 12/2015 | Liu | G06Q 30/0244 705/14.43 |

* cited by examiner

*Primary Examiner* — Tauqir Hussain
(74) *Attorney, Agent, or Firm* — Sheppard Mullin Richter & Hampton LLP

(57) ABSTRACT

Systems, methods, and non-transitory computer-readable media can identify a page within a social networking system. Information associated with at least one of the page or a representative of the page can be acquired. A set of calls to action implementable at the page can be identified. The set of calls to action can be ranked based on the information associated with at least one of the page or the representative of the page.

19 Claims, 9 Drawing Sheets

SYSTEMS AND METHODS FOR RANKING CALLS TO ACTION BASED ON INFORMATION ASSOCIATED WITH ONLINE RESOURCES

FIELD OF THE INVENTION

The present technology relates to the field of online user experiences. More particularly, the present technology relates to techniques for ranking calls to action based on information associated with online resources.

BACKGROUND

Today, people often utilize computing devices (or systems) for a wide variety of purposes. Users can use their computing devices to, for example, interact with one another, access content, share content, and create content. In some instances, users can utilize their computing devices to engage with businesses, utilize web resources, and/or access information about various subjects that may be of interest to them. For example, users of a social networking system (or service) can, via their computing devices, access various pages within the social networking system to inquire about various matters, obtain information, or perform various tasks associated with the pages.

In one example, a user can utilize a computing device to access the social networking system (or service) and view information about a resource, such as a page, within the social networking system. However, under conventional approaches specifically arising in the realm of computer technology, only limited functionality can be provided to the user via the page within the social networking system. In another example, the user can use the computing device to browse online and encounter a call to action (CTA) while browsing online. However, conventional approaches to utilizing calls to action (CTA's) can be inefficient, irrelevant, or not adequately interactive. As such, conventional approaches can create challenges for or reduce the overall experience associated with utilizing online resources, such as pages within social networking systems.

SUMMARY

Various embodiments of the present disclosure can include systems, methods, and non-transitory computer readable media configured to identify a page within a social networking system. Information associated with at least one of the page or a representative of the page can be acquired. A set of calls to action implementable at the page can be identified. The set of calls to action can be ranked based on the information associated with at least one of the page or the representative of the page.

In an embodiment, ranking the set of calls to action based on the information can further comprise inputting the information into a model for evaluating call to action relevancy. The model can be utilized to determine, for each call to action in the set of calls to action, a respective confidence score representing a respective level of relevance associated with each call to action relative to the page.

In an embodiment, the set of calls to action can be sorted based on the respective confidence score for each call to action. A first call to action with a higher confidence score can be sorted higher in priority than a second call to action with a lower confidence score.

In an embodiment, the model can be trained based on one or more machine learning processes. The one or more machine learning processes can use training data including information associated with at least one of other pages within the social networking system or other representatives of the other pages.

In an embodiment, the model can be dynamically updatable based on new training data collected over time.

In an embodiment, ranking the set of calls to action based on the information can further comprise identifying a second page within the social networking that is associated with at least a threshold similarity metric with respect to the page. A particular call to action, out of the set of calls to action, that is implemented at the second page can be identified. A particular confidence score representing a particular level of relevance associated with the particular call to action relative to the page can be increased.

In an embodiment, the representative can be provided with access to a list of one or more calls to action identified based on ranking the set of calls to action. Each of the one or more calls to action can at least satisfy specified ranking threshold criteria. Each of the one or more calls to action can be selectable by the representative for implementation at the page.

In an embodiment, one or more calls to action identified based on ranking the set of calls to action can be recommended for implementation at the page by the representative. Each of the one or more calls to action can at least satisfy specified ranking threshold criteria.

In an embodiment, the one or more calls to action can include a single call to action. The specified ranking threshold criteria can require the single call to action to correspond to a highest ranked call to action out of the set of calls to action.

In an embodiment, the information associated with at least one of the page or the representative of the page can include one or more signals associated with the page. The one or more signals associated with the page can include at least one of a category signal, a location signal, a popularity signal, a web address signal, an availability signal, a physical address signal, or a media content signal.

In an embodiment, the information associated with at least one of the page or the representative of the page can include one or more signals associated with the representative. The one or more signals associated with the representative can include at least one of a historical behavior signal, a representative location signal, a representative language signal, or a representative demographic signal.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
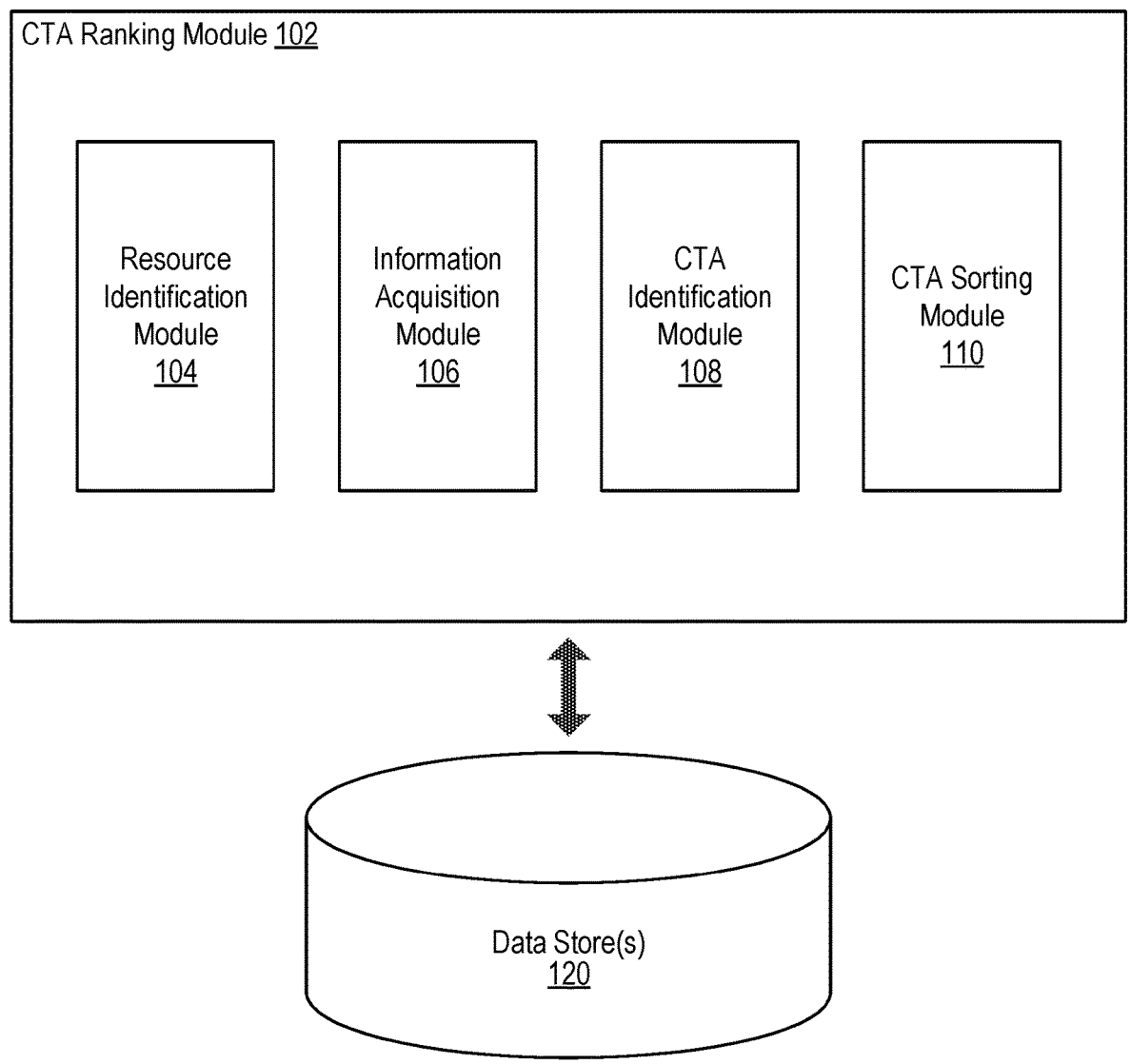
FIG. 1 illustrates an example system including an example call to action (CTA) ranking module configured to facilitate ranking calls to action (CTA's) based on information associated with online resources, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Ranking Calls to Action Based on Information Associated with Online Resources

People use computing systems (or devices) for various purposes. Users can utilize their computing systems to establish connections, engage in communications, interact with one another, and/or interact with various types of content. In some cases, people can utilize their computing devices to browse online (or web) resources, view details associated with businesses, make purchases online, make reservations at restaurants, and/or access and utilize other information. A local business can, for instance, be associated with an online resource, such as a particular page within a social networking system (or service). As such, via the particular page within the social networking system, users can access or utilize information associated with the local business.

In one example, a user can utilize his or her computing device to browse through various online resources, such as pages within the social networking system, websites, or applications, etc. Under conventional approaches specifically arising in the realm of computer technology for performing tasks via online resources, during the browsing, the user can be presented with advertising or marketing material, such as calls to action (CTA's). The calls to action can attempt to encourage the user to take certain actions. For example, one type of call to action can encourage the user to make a purchase, such as to buy a product or service from an e-commerce storefront provided via a particular online resource. However, under such conventional approaches, as the quantity and/or types of calls to action increase, it can be challenging or inconvenient for an admin or a representative of an online resource to select which call(s) to action to implement or utilize for the online resource. For instance, when less relevant or less appropriate calls to action are presented via the online resource, user interaction (e.g., customer engagement) with the calls to action may decrease. Accordingly, such conventional approaches specifically arising in the realm of computer technology for performing tasks via online resources can be inefficient or inconvenient.

Due to these or other concerns, conventional approaches specifically arising in the realm of computer technology can be disadvantageous or problematic. Therefore, an improved approach rooted in computer technology that overcomes the foregoing and other disadvantages associated with conventional approaches can be beneficial. Based on computer technology, the disclosed technology can rank calls to action based on (i.e., based, at least in part, on) information associated with online resources. Various embodiments of the present disclosure can include systems, methods, and non-transitory computer readable media configured to identify a page within a social networking system. Information associated with at least one of the page or a representative of the page can be acquired. A set of calls to action implementable at the page can be identified. The set of calls to action can be ranked based on the information associated with at least one of the page or the representative of the page. It is contemplated that there can be many variations and/or other possibilities associated with the disclosed technology.

FIG. 1 illustrates an example system 100 including an example call to action (CTA) ranking module 102 configured to facilitate ranking calls to action (CTA's) based on information associated with online resources, according to an embodiment of the present disclosure. As shown in the example of FIG. 1, the CTA ranking module 102 can include a resource identification module 104, an information acquisition module 106, a CTA identification module 108, and a CTA sorting module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the CTA ranking module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the CTA ranking module 102 can be implemented, in part or in whole, as software running on one or more computing devices or systems, such as on a user or client computing device. For example, the CTA ranking module 102 or at least a portion thereof can be implemented as or within an application (e.g., app), a program, an applet, or an operating system, etc., running on a user computing device or a client computing system, such as the user device 610 of FIG. 6. In another example, the CTA ranking module 102 or at least a portion thereof can be implemented using one or more computing devices or systems that include one or more servers, such as network servers or cloud servers. In some instances, the CTA ranking module 102 can, in part or in whole, be implemented within or configured to operate in conjunction with a social networking system (or service), such as the social networking system 630 of FIG. 6. It should be appreciated that there can be many variations or other possibilities.

The resource identification module 104 can be configured to facilitate identifying an online resource. In some cases, an online resource can be associated with an entity, such as a business, a brand, a store, a restaurant, a café, or a public figure (e.g., celebrity, politician, etc.). For instance, the online resource can correspond to a page within a social networking system, and the page can be associated with a particular entity. In this instance, the particular entity can utilize the page for promotional purposes, advertising purposes, marketing purposes, business purposes, and/or other purposes.

In one example, the resource identification module 104 can identify each page within the social networking system as a possible candidate to which the disclosed technology can be applied. In another example, the resource identification module 104 can identify only those pages in the social networking system determined or specified to have promotional, advertising, marketing, and/or business interests. In a further example, if a particular entity or representative specifies that one or more calls to action are to be implemented at its particular page, then the resource identification module 104 can identify the particular page. It is contemplated that all examples herein are provided for illustrative purposes and that many variations associated with the disclosed technology are possible.

In addition, the information acquisition module 106 can be configured to facilitate acquiring information associated with at least one of the identified page or a representative of the identified page. More details regarding the information acquisition module 106 will be provided below with reference to FIG. 2A.

Moreover, the CTA identification module 108 can be configured to facilitate identifying a set of calls to action implementable at the identified page. In some embodiments, the CTA identification module 108 can identify the set of calls to action to include a default, preset, predefined, or specified collection of calls to action. In some implementations, the CTA identification module 108 can identify the set to include only some of the calls to action in the default, preset, predefined, or specified collection. For instance, the CTA identification module 108 can identify only the top X calls to action that are most popular, most common, and/or most frequently used by certain pages or across the entire social networking system.

Examples of calls to action can include, but are not limited to, a "Buy Now" call to action (e.g., for a product/service), a "Shop Now" call to action (e.g., for a product/service), a "Pay Now" call to action (e.g., for a financial transaction), a "Book Now" call to action (e.g., for a ticket), a "Reserve Now" call to action (e.g., for a restaurant), a "Sign Up" call to action (e.g., for a service), a "Log In" call to action (e.g., for providing information after authentication), a "Watch Now" call to action (e.g., for a media content item), a "View Now" call to action (e.g., for seeing information), a "Contact Us" call to action (e.g., for inviting further communication), an "Install Now" call to action (e.g., for software), a "Go to App" call to action (e.g., for additional functionality), a "Play Now" call to action (e.g., for a game), a "Like This" call to action (e.g., for indicating support or satisfaction), a "See More" call to action (e.g., for accessing more information), and a "More Info" call to action (e.g., for accessing more information), etc. In some cases, other calls to action relating to any action that may be taken by a user can be created. As discussed, it should be understood that all examples herein are provided for illustrative purposes and that there can be many variations or other possibilities associated with the disclosed technology.

Furthermore, the CTA sorting module 110 can be configured to facilitate sorting, ordering, prioritizing, and/or otherwise ranking the set of calls to action based on the information associated with at least one of the page or the representative of the page. The CTA sorting module 110 will be discussed in more detail below with reference to FIG. 2B.

Additionally, in some embodiments, the CTA ranking module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the CTA ranking module 102. Again, it is contemplated that there can be many variations or other possibilities associated with the disclosed technology.

Figure 2A:
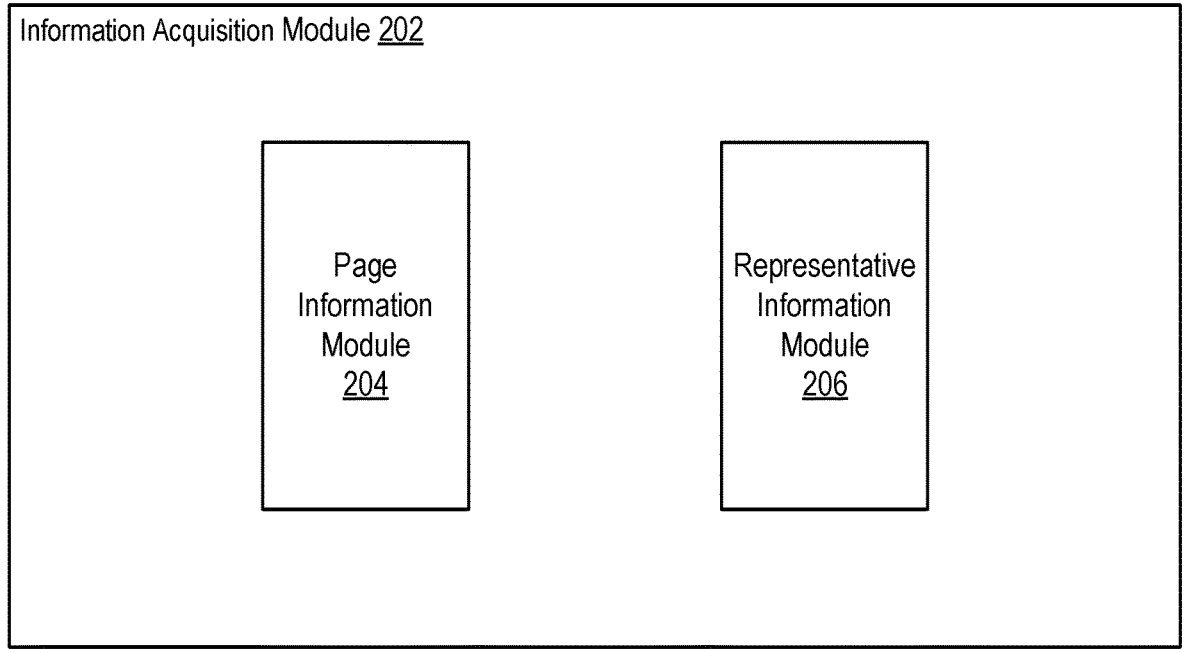
FIG. 2A illustrates an example information acquisition module configured to facilitate ranking calls to action based on information associated with online resources, according to an embodiment of the present disclosure.

FIG. 2A illustrates an example information acquisition module 202 configured to facilitate ranking calls to action based on information associated with online resources, according to an embodiment of the present disclosure. In some embodiments, the information acquisition module 106 of FIG. 1 can be implemented as the example information acquisition module 202. As shown in FIG. 2A, the information acquisition module 202 can include a page information module 204 and a representative information module 206.

As discussed previously, the information acquisition module 202 can be configured to facilitate acquiring information associated with at least one of an identified page or a representative (e.g., admin, manager, etc.) of the identified page. The information associated with at least one of the page or the representative of the page can be subsequently utilized (i.e., utilized at least in part) to facilitate ranking an identified set of calls to action implementable at the page.

In some embodiments, the information associated with at least one of the page or the representative of the page can include one or more signals (or features, properties, etc.) associated with the page. The information acquisition module 202 can utilize the page information module 204 to facilitate acquiring the one or more signals associated with the page. In some cases, the one or more signals associated with the page can include at least one of a category signal, a location signal, a popularity signal, a web address signal, an availability signal, a physical address signal, or a media content signal, etc. There can be many variations or other possibilities.

In some instances, the category signal can indicate a type, kind, class, category, and/or super-category for a particular page, such as whether the particular page is for a local store, a local restaurant, an electronic store, a franchise restaurant, a brand, or a celebrity, etc. For example, if the category signal indicates that a particular page is for a local restaurant, then the disclosed technology can determine that a "Book Now" call to action is more relevant for the particular page than a "Shop Now" call to action. As such, in this example, the "Book Now" call to action can be ranked more highly than the "Shop Now" call to action.

Moreover, in some cases, the location signal can indicate where an entity associated with a particular page is located (e.g., a country, a region, a city, etc.). The popularity signal can indicate how many likes, up-votes, fans, and/or supporters a page has. The web address signal can provide data about a URL of a page, such as whether the URL is directed to a video stream, an image, or a website, etc. For instance, if the web address signal indicates that a URL of a particular page is directed to a video stream, then the disclosed technology can determine, for the particular page, that a "Watch Video" (or "Watch Now", etc.) call to action is more relevant and can be ranked higher than some other calls to action. Further, the availability signal can indicate when an entity associated with a page is available (e.g., office hours, business hours, etc.). The physical address signal can indicate that an entity associated with a page has an actual, real-world address. As such, a "Visit Us" (or "Get Directions", "Get a Ride", "Find Location", etc.) call to action can, for instance, be more relevant and be ranked higher than some other calls to action for the page. The media content signal can indicate whether a page has provided a cover photo, a profile picture, and/or media posts. Each of the above signals can be utilized (alone or in combination), at least in part, to facilitate ranking calls to action.

In some implementations, the information associated with at least one of the page or the representative of the page can include one or more signals associated with the representative (of the page). The information acquisition module 202 can utilize the representative information module 206 to facilitate acquiring the one or more signals associated with the representative. For instance, the one or more signals associated with the representative can include at least one of a historical behavior signal (e.g., which calls to action have been selected/utilized by the representative in the past), a representative location signal (e.g., where the representative is located), a representative language signal (e.g., which language(s) does the representative use), or a representative demographic signal (e.g., other demographical data for the representative), etc. These signals can be utilized (alone or in combination), at least in part, to facilitate ranking calls to action. Again, there can be many variations or other possibilities associated with the disclosed technology.

Figure 2B:
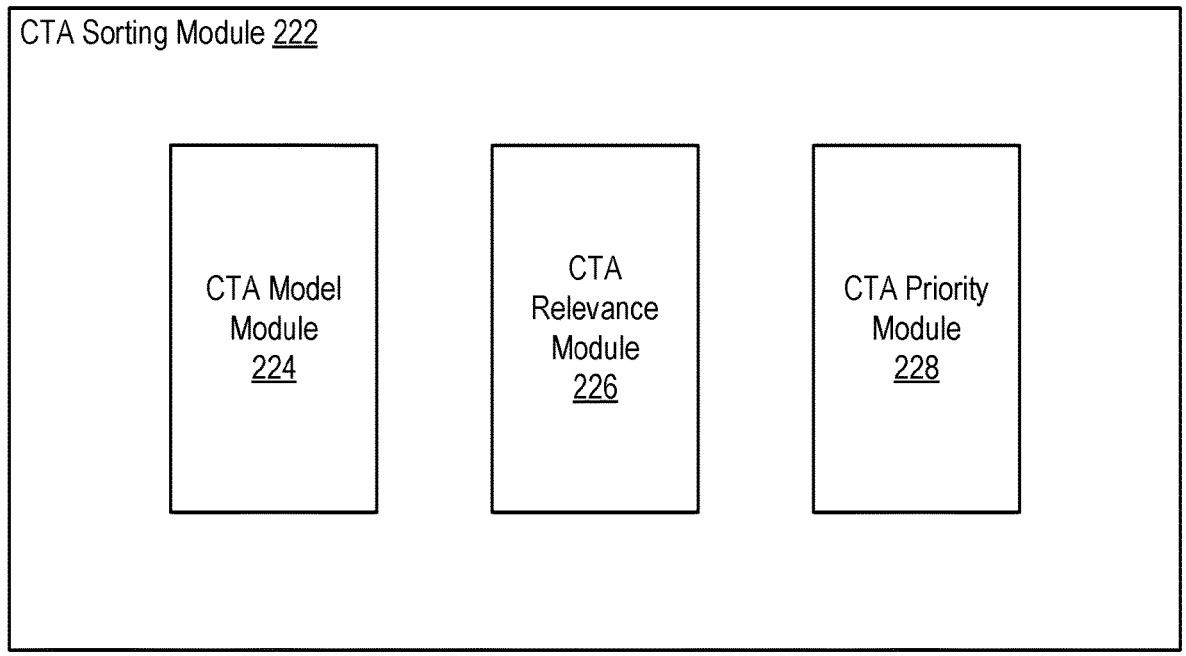
FIG. 2B illustrates an example CTA sorting module configured to facilitate ranking calls to action based on information associated with online resources, according to an embodiment of the present disclosure.

FIG. 2B illustrates an example CTA sorting module 222 configured to facilitate ranking calls to action based on information associated with online resources, according to an embodiment of the present disclosure. In some embodiments, the CTA sorting module 110 of FIG. 1 can be implemented as the example CTA sorting module 222. As shown in FIG. 2B, the CTA sorting module 222 can include a CTA model module 224, a CTA relevance module 226, and a CTA priority module 228.

The CTA sorting module 222 can be configured to facilitate sorting, ordering, prioritizing, and/or otherwise ranking an identified set of calls to action based on acquired information associated with at least one of an identified page or a representative of the identified page, as discussed above. In some implementations, the CTA sorting module 222 can utilize the CTA model module 224 to input the acquired information into a model for evaluating call to action relevancy. The CTA relevance module 226 can utilize the model to determine, for each call to action in the set of calls to action, a respective confidence score representing a respective level of relevance associated with each call to action relative to the identified page. In addition, the CTA priority module 228 can prioritize, order, rank, and/or otherwise sort the set of calls to action based on the respective confidence score for each call to action. For instance, a first call to action with a higher confidence score can be sorted or ranked higher in priority than a second call to action with a lower confidence score. Many variations are possible.

Moreover, in some embodiments, the disclosed technology can acquire a set of training data (e.g., labeled data) including information about which calls to action have been utilized at which pages within the social networking system, as well as one or more signals associated with the pages and/or with representatives of the pages. Based on the training data, the disclosed technology can utilize machine learning to determine which calls to action are more likely to be relevant to a particular page. In some instances, each call to action in the identified set of calls to action can be ranked based on its likely relevance with respect to the particular page. The CTA model module 224 can, for instance, train the model based on one or more machine learning processes. The one or more machine learning processes can use training data including information associated with at least one of other pages within the social networking system or other representatives of the other pages. Additionally, in some cases, the CTA model module 224 can cause the model to be dynamically updatable based on new training data collected over time.

Furthermore, in one example, ranking the set of calls to action based on the information can further comprise identifying a second page within the social networking that has or is associated with at least a threshold similarity metric with respect to the identified page. In this example, the disclosed technology can determine, such as based on page signals, that the identified page and the second page are similar or matching within an allowable deviation. A particular call to action, out of the set of calls to action, that is implemented at the second page can be identified. A particular confidence score representing a particular level of relevance associated with the particular call to action relative to the identified page can then be increased or boosted. Again, all examples herein are provided for illustrative purposes and many variations associated with the disclosed technology are possible.

Figure 3A:
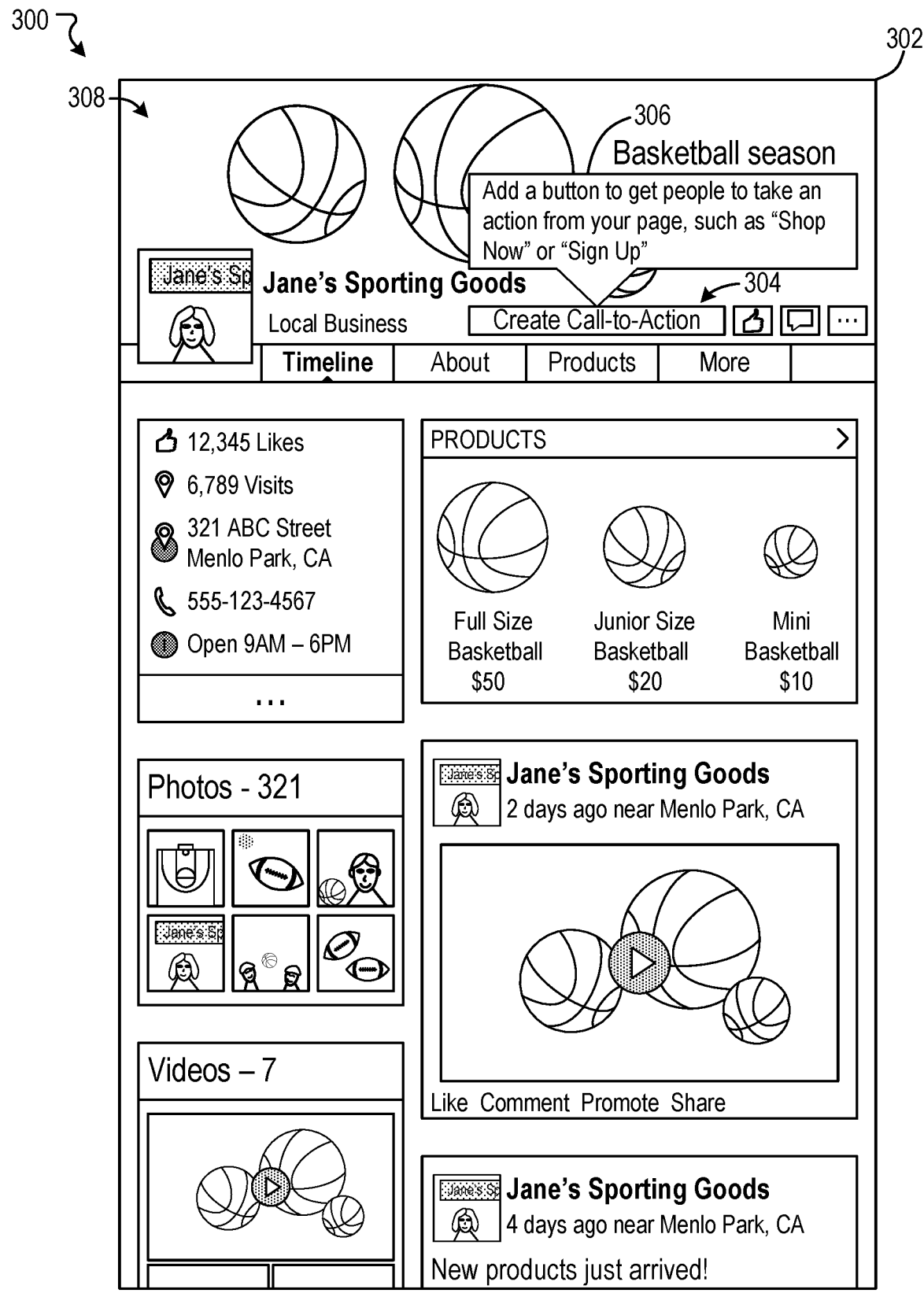
FIG. 3A illustrates an example scenario associated with ranking calls to action based on information associated with online resources, according to an embodiment of the present disclosure.

FIG. 3A illustrates an example scenario 300 associated with ranking calls to action based on information associated with online resources, according to an embodiment of the present disclosure. The example scenario 300 illustrates an example online resource, such as a page 302 within a social networking system. In this example scenario 300, the disclosed technology can cause the example page 302 to provide an interactive element (e.g., a button) 304 for creating a call to action. For instance, if calls to action have yet to be created for the page 302, then when a representative associated with the page 302 visits, views, or accesses the page 302, the interactive element 304 can be provided. Subsequently, when the representative of the page 302 clicks on, taps on, or otherwise interacts with the interactive element 304 for creating the call to action, a request to create the call to action for the page 302 can be made by the representative. In some embodiments, when the representative of the page 302 performs a mouse hover or a button hold (e.g., tap and press), etc., with respect to the interactive element 304, an explanation or description 306 can be provided. As shown, the explanation or description 306 can indicate to the representative the purpose of the interactive element 304.

Furthermore, in some implementations, the interactive element 304 and/or the call to action can be presentable via at least one cover photo 308 associated with the page 302. The at least one cover photo 308 can be configured to receive a user interaction. The user interaction can, for instance, include a click, a tap gesture, a scroll command, and/or a swipe gesture, etc. In one example, a plurality of cover photos for the page 302 can present a plurality of products or services. The plurality of cover photos can be scrolled or navigated through, similar to a virtual carousel, in order to view or access each of the plurality of products or services. One or more calls to action can be created for each of the plurality of products or services accessible via the plurality of cover photos for the page 302. It should be appreciated that many variations are possible.

Figure 3B:
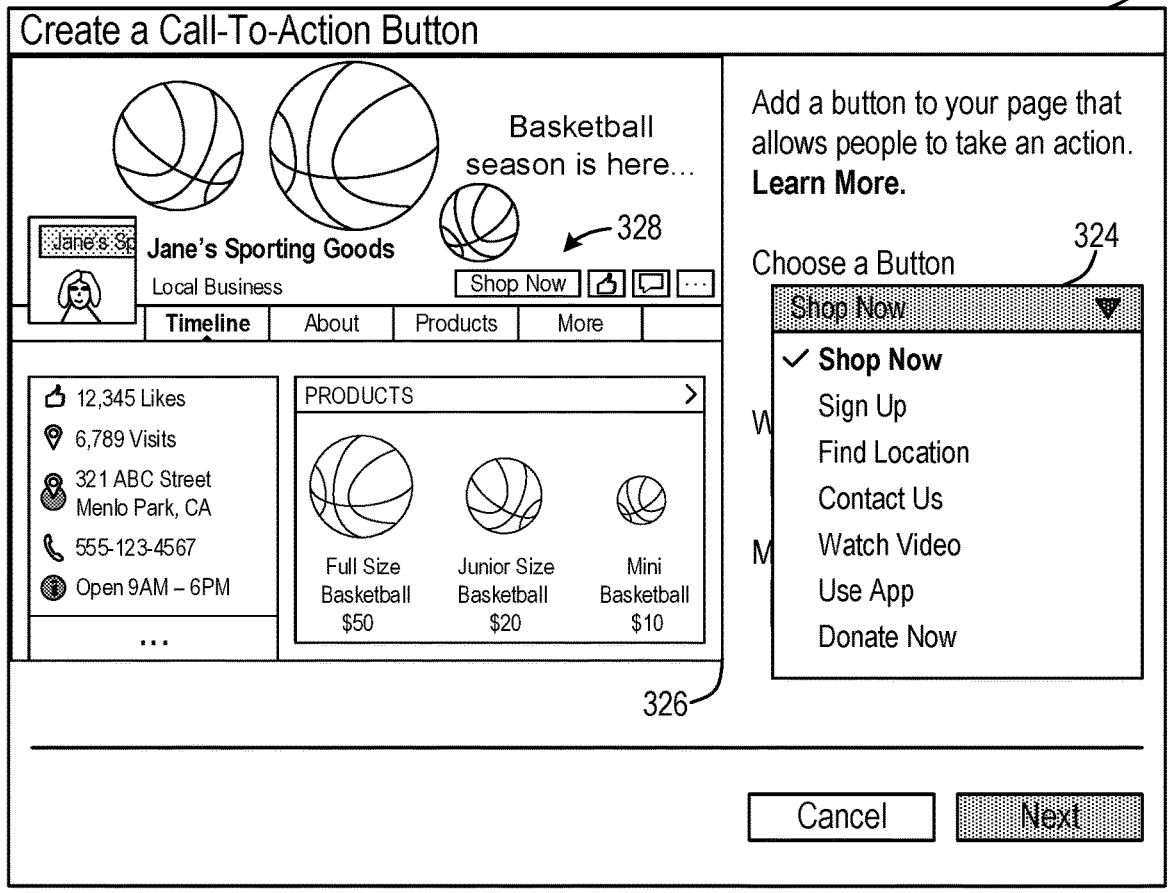
FIG. 3B illustrates an example scenario associated with ranking calls to action based on information associated with online resources, according to an embodiment of the present disclosure.

FIG. 3B illustrates an example scenario 320 associated with ranking calls to action based on information associated with online resources, according to an embodiment of the present disclosure. The example scenario 320 illustrates an example interface 322 that provides one or more call to action options 324 for creating a call to action for an online resource, such as the page 302 of FIG. 3A. In the example of FIG. 3B, the one or more call to action options 324 can be ranked, sorted, and/or prioritized based on information associated with the page (which can include information associated with a representative of the page). In the example scenario 320, the information associated with the page can indicate that the page is for a local business with an electronic storefront. As such, the disclosed technology can provide the one or more call to action options 324 in a ranked order as shown. In one example, the representative can be provided with access to a list of one or more calls to action (e.g., the one or more call to action options 324) identified based on ranking a set of calls to action. Each of the one or more calls to action can at least satisfy specified ranking threshold criteria. In this example, the specified ranking threshold criteria can require the one or more calls to action to include only the seven highest ranked calls to action. Each of the one or more calls to action can be selectable by the representative for implementation at the page. Additionally, as shown, the example interface 322 can provide a preview 326 of the page when a call to action is selected. In this example scenario 320, the representative of the page can select or utilize the "Shop Now" call to action 328.

Furthermore, in some implementations, one or more calls to action identified based on ranking a set of calls to action can be recommended to the representative for implementation at the page. Each of the one or more calls to action can at least satisfy specified ranking threshold criteria. In one instance, the one or more calls to action can include a single call to action. In this instance, the specified ranking threshold criteria can require the single call to action to correspond to a highest ranked call to action out of the set of calls to action. Again, all examples herein are provided for illustrative purposes and there can be many variations or other possibilities associated with the disclosed technology.

Figure 4:
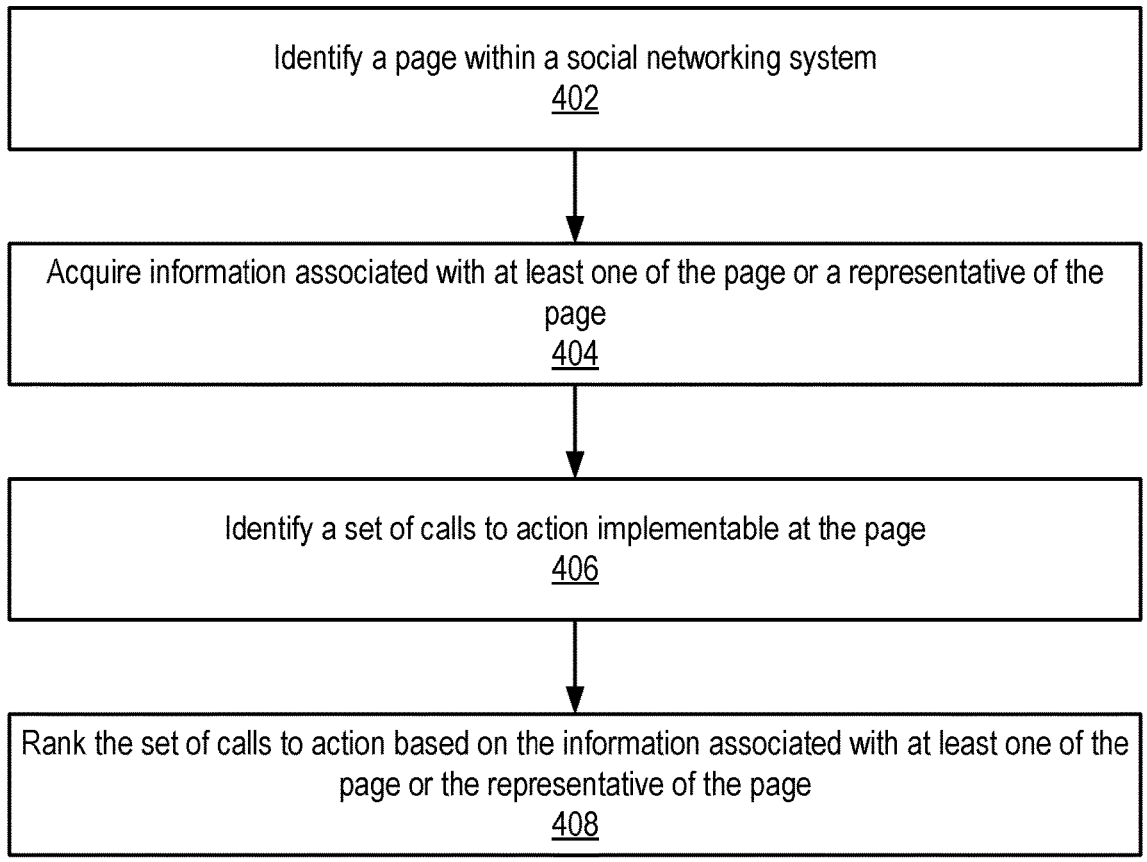
FIG. 4 illustrates an example method associated with ranking calls to action based on information associated with online resources, according to an embodiment of the present disclosure.

FIG. 4 illustrates an example method 400 associated with ranking calls to action based on information associated with online resources, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can identify a page within a social networking system. At block 404, the example method 400 can acquire information associated with at least one of the page or a representative of the page. At block 406, the example method 400 can identify a set of calls to action implementable at the page. At block 408, the example method 400 can rank the set of calls to action based on the information associated with at least one of the page or the representative of the page.

Figure 5:
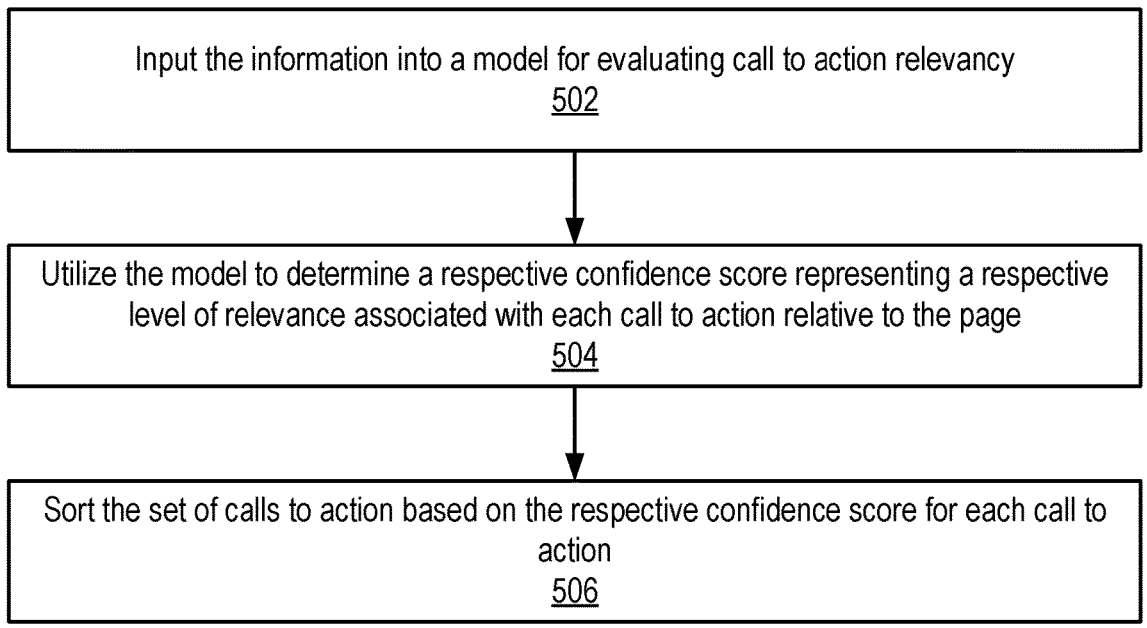
FIG. 5 illustrates an example method associated with ranking calls to action based on information associated with online resources, according to an embodiment of the present disclosure.

FIG. 5 illustrates an example method 500 associated with ranking calls to action based on information associated with online resources, according to an embodiment of the present disclosure. As discussed, it should be understood that there can be additional, fewer, or alternative steps performed in similar or alternative orders, or in parallel, within the scope of the various embodiments unless otherwise stated.

At block 502, the example method 500 can input the information into a model for evaluating call to action relevancy. At block 504, the example method 500 can utilize the model to determine, for each call to action in the set of calls to action, a respective confidence score representing a respective level of relevance associated with each call to action relative to the page. At block 506, the example method 500 can sort the set of calls to action based on the respective confidence score for each call to action, A first call to action with a higher confidence score can be sorted higher in priority than a second call to action with a lower confidence score.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
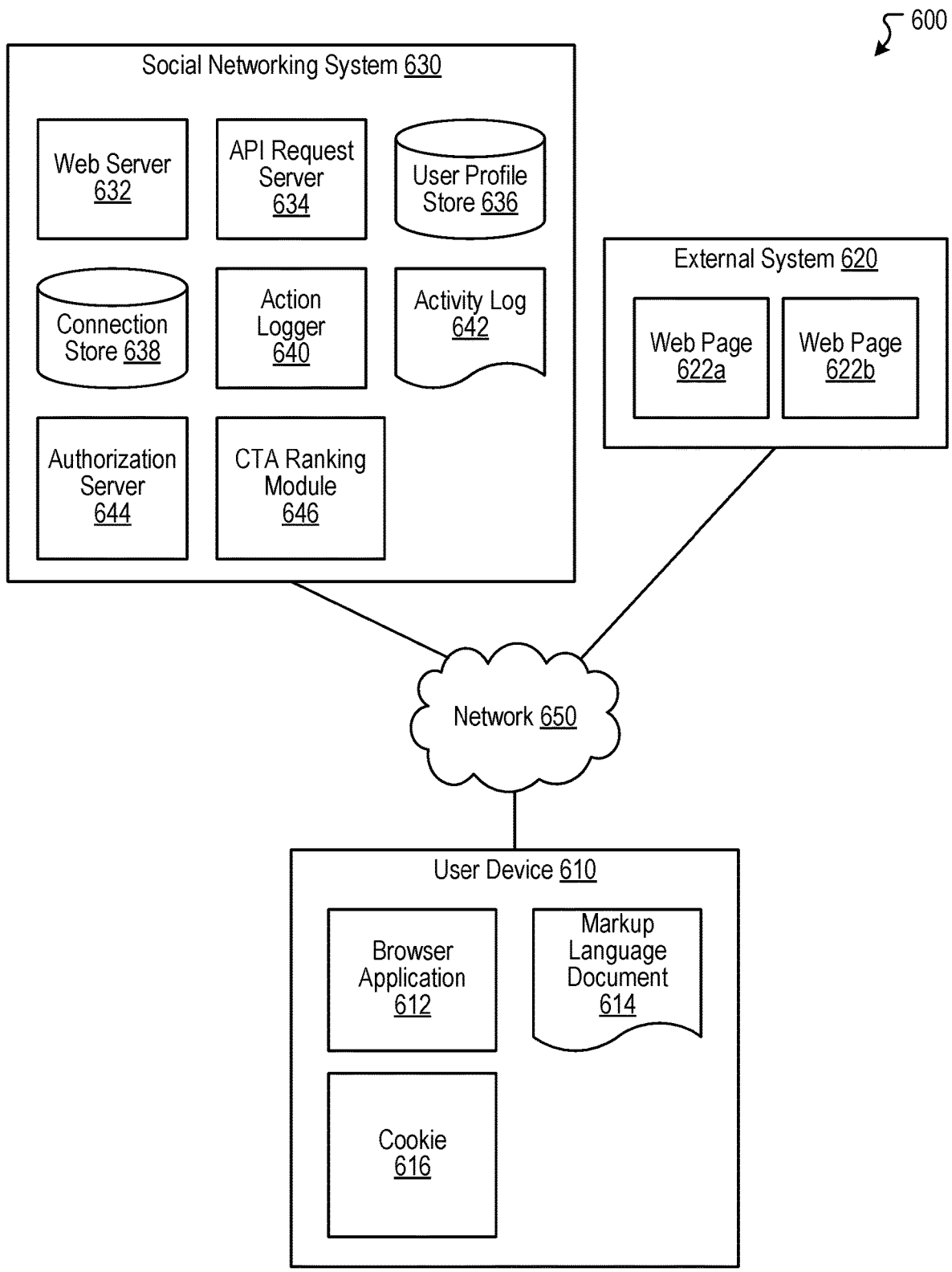
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet. In some embodiments, the social networking system 630 can include or correspond to a social media system (or service).

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11 (e.g., Wi-Fi), worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a CTA ranking module 646. The CTA ranking module 646 can, for example, be implemented as the CTA ranking module 102 of FIG. 1. As discussed previously, it should be appreciated that there can be many variations or other possibilities. For example, in some instances, the CTA ranking module (or at least a portion thereof) can be included or implemented in the user device 610. Other features of the CTA ranking module 646 are discussed herein in connection with the CTA ranking module 102.

Hardware Implementation

Figure 7:
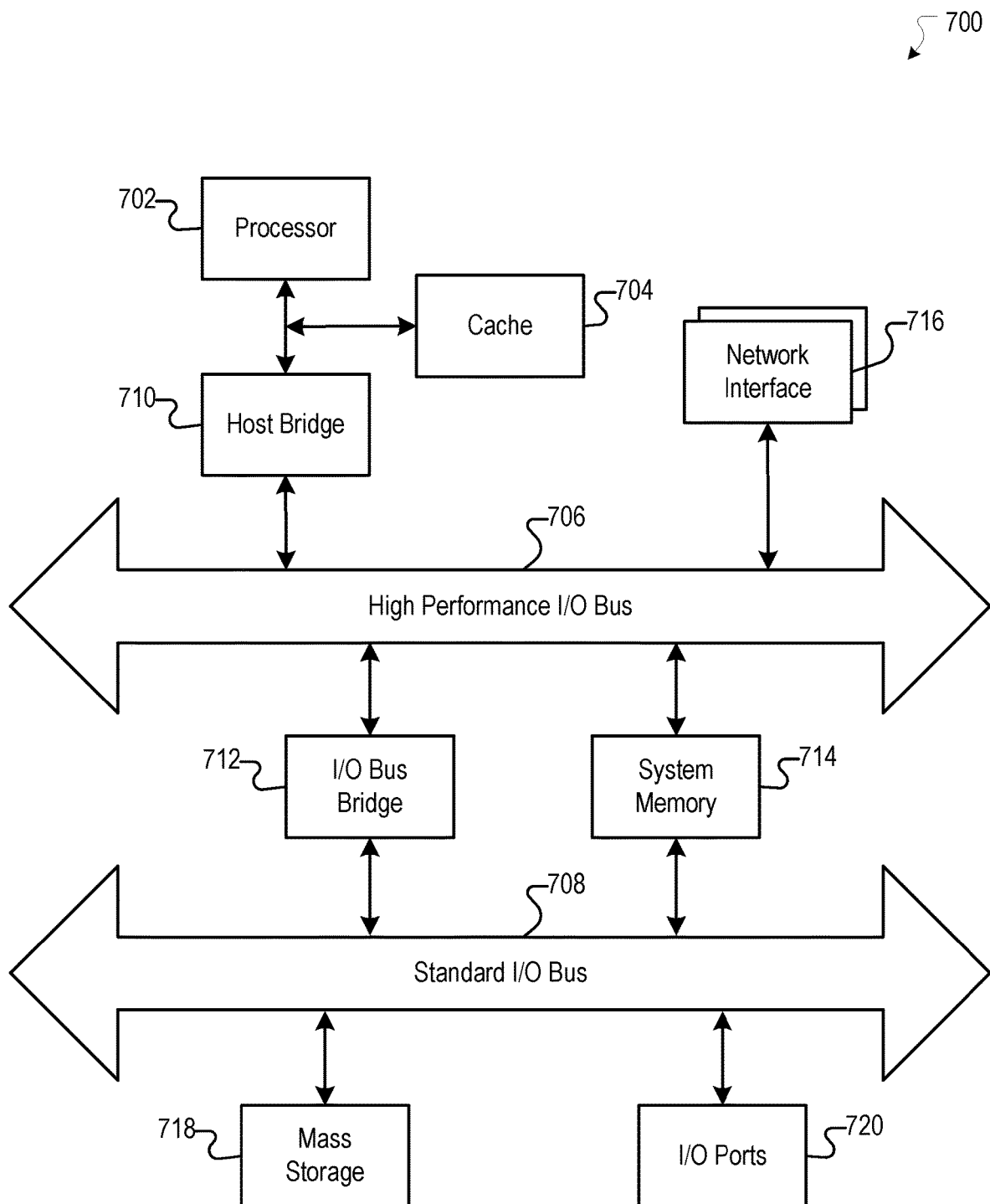
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a page within a social networking system, wherein the computing system is operated by a provider of the social networking system;
   acquiring, by the computing system, information associated with at least one of the page or an administrator of the page;
   identifying, by the computing system, a set of calls to action associated with the page, the set of calls to action implementable at the page to encourage actions by users of the social networking system;
   ranking, by the computing system, the set of calls to action based on the information associated with at least one of the page or the administrator of the page; and
   providing, by the computing system, the administrator with access to a list of calls to action identified based on ranking the set of calls to action, wherein the calls to action in the list differ from one another and satisfy a ranking threshold criterion relating to a predetermined number of highest ranking calls to action.

2. The computer-implemented method of claim 1, wherein ranking the set of calls to action based on the information further comprises:
inputting the information into a model for evaluating call to action relevancy;
utilizing the model to determine, for each call to action in the set of calls to action, a respective confidence score representing a respective level of relevance associated with each call to action relative to the page; and
sorting the set of calls to action based on the respective confidence score for each call to action, wherein a first call to action with a higher confidence score is sorted higher in priority than a second call to action with a lower confidence score.

3. The computer-implemented method of claim 2, wherein the model is trained based on one or more machine learning processes, and wherein the one or more machine learning processes use training data including information associated with at least one of other pages within the social networking system or other administrators of the other pages.

4. The computer-implemented method of claim 3, wherein the model is dynamically updatable based on new training data collected over time.

5. The computer-implemented method of claim 1, wherein ranking the set of calls to action based on the information further comprises:
identifying a second page within the social networking that is associated with at least a threshold similarity metric with respect to the page;
identifying a particular call to action, out of the set of calls to action, that is associated with the second page; and
increasing a particular confidence score representing a particular level of relevance associated with the particular call to action relative to the page.

6. The computer-implemented method of claim 1, wherein each of the calls to action is selectable by the administrator for implementation at the page.

7. The computer-implemented method of claim 1, further comprising:
recommending, for implementation at the page by the administrator, one or more of the calls to action.

8. The computer-implemented method of claim 7, wherein a single call to action is recommended, and wherein the ranking threshold criterion requires the single call to action to correspond to a highest ranked call to action.

9. The computer-implemented method of claim 1, wherein the information associated with at least one of the page or the administrator of the page includes one or more signals associated with the page, and wherein the one or more signals associated with the page include at least one of a category signal, a location signal, a popularity signal, a web address signal, an availability signal, a physical address signal, or a media content signal.

10. The computer-implemented method of claim 1, wherein the information associated with at least one of the page or the administrator of the page includes one or more signals associated with the administrator, and wherein the one or more signals associated with the representative include at least one of a historical behavior signal, a representative location signal, a representative language signal, or a representative demographic signal.

11. A system comprising:
at least one processor; and
a memory storing instructions that, when executed by the at least one processor, cause the system to perform:
identifying a page within a social networking system, wherein the computing system is operated by a provider of the social networking system;
acquiring information associated with at least one of the page or an administrator of the page;
identifying a set of calls to action associated with the page, the set of calls to action implementable at the page to encourage actions by users of the social networking system;
ranking the set of calls to action based on the information associated with at least one of the page or the administrator of the page; and
providing, by the computing system, the administrator with access to a list of calls to action identified based on ranking the set of calls to action, wherein the calls to action in the list differ from one another and satisfy a ranking threshold criterion relating to a predetermined number of highest ranking calls to action.

12. The system of claim 11, wherein ranking the set of calls to action based on the information further comprises:
inputting the information into a model for evaluating call to action relevancy;
utilizing the model to determine, for each call to action in the set of calls to action, a respective confidence score representing a respective level of relevance associated with each call to action relative to the page; and
sorting the set of calls to action based on the respective confidence score for each call to action, wherein a first call to action with a higher confidence score is sorted higher in priority than a second call to action with a lower confidence score.

13. The system of claim 11, wherein the instructions cause the system to further perform:
recommending, for implementation at the page by the administrator, one or more of the calls to action.

14. The system of claim 11, wherein the information associated with at least one of the page or the administrator of the page includes one or more signals associated with the page, and wherein the one or more signals associated with the page include at least one of a category signal, a location signal, a popularity signal, a web address signal, an availability signal, a physical address signal, or a media content signal.

15. A non-transitory computer-readable storage medium including instructions that, when executed by at least one processor of a computing system, cause the computing system to perform a method comprising:
identifying a page within a social networking system, wherein the computing system is operated by a provider of the social networking system;
acquiring information associated with at least one of the page or an administrator of the page;
identifying a set of calls to action associated with the page, the set of calls to action implementable at the page to encourage actions by users of the social networking system;
ranking the set of calls to action based on the information associated with at least one of the page or the administrator of the page; and
providing, by the computing system, the administrator with access to a list of calls to action identified based on ranking the set of calls to action, wherein the calls to action in the list differ from one another and satisfy a ranking threshold criterion relating to a predetermined number of highest ranking calls to action.

16. The non-transitory computer-readable storage medium of claim 15, wherein ranking the set of calls to action based on the information further comprises:
   inputting the information into a model for evaluating call to action relevancy;
   utilizing the model to determine, for each call to action in the set of calls to action, a respective confidence score representing a respective level of relevance associated with each call to action relative to the page; and
   sorting the set of calls to action based on the respective confidence score for each call to action, wherein a first call to action with a higher confidence score is sorted higher in priority than a second call to action with a lower confidence score.

17. The non-transitory computer-readable storage medium of claim 15, wherein ranking the set of calls to action based on the information further comprises:
   recommending, for implementation at the page by the administrator, one or more of the calls to action.

18. The non-transitory computer-readable storage medium of claim 15, wherein the information associated with at least one of the page or the administrator of the page includes one or more signals associated with the page, and wherein the one or more signals associated with the page include at least one of a category signal, a location signal, a popularity signal, a web address signal, an availability signal, a physical address signal, or a media content signal.

19. The computer-implemented method of claim 1, wherein a plurality of calls to action are selected by the administrator and each call to action of the plurality is associated with a respective product or service of a plurality of products or services of the page.

\* \* \* \* \*